United States Patent [19]

Mabuchi

[11] 4,092,556
[45] May 30, 1978

[54] FORCED COOLED ELECTRIC MOTOR

[75] Inventor: Kenichi Mabuchi, Tokyo, Japan

[73] Assignee: Mabuchi Motor Co., Ltd., Tokyo, Japan

[21] Appl. No.: 604,891

[22] Filed: Aug. 14, 1975

[30] Foreign Application Priority Data

Aug. 24, 1974 Japan .................................. 49-97154
Aug. 24, 1974 Japan .................................. 49-97155
Aug. 24, 1974 Japan .................................. 49-97156

[51] Int. Cl.² ............................................. H02K 9/08
[52] U.S. Cl. ...................................... 310/57; 310/62; 310/63; 310/227
[58] Field of Search ................................. 310/54–65, 310/50, 227, 47

[56] References Cited

U.S. PATENT DOCUMENTS

| 2,749,049 | 6/1956  | Smith          | 310/53 UX |
| 3,461,328 | 8/1969  | Dronard        | 310/59 X  |
| 3,486,055 | 12/1969 | Lipstein       | 310/227   |
| 3,529,189 | 9/1970  | Armstrong      | 310/59    |
| 3,648,086 | 3/1972  | Renner et al.  | 310/227 X |
| 3,673,447 | 6/1972  | Fumbach et al. | 310/227   |
| 3,714,478 | 1/1973  | DeMania et al. | 310/57 X  |
| 3,840,762 | 10/1974 | Kasabian       | 310/50    |
| 3,978,354 | 8/1976  | Lee et al.     | 310/63 X  |

Primary Examiner—Donovan F. Duggan

[57] ABSTRACT

An electric motor comprising a rotor, a stator and a commutator means for controlling energization of the rotor or the stator is equipped with ducts which open opposite the surface of contact between the brushes and the commutator of said commutator means for directing jet of a cooling medium through the ducts directly onto the commutator means so as to prevent the efficiency drop of the motor due to heat generated therein and to forcibly blow out sparks occurring at the commutator means, in order to provide a forced cooled electric motor which is small in size and weight and yet can produce a high power.

16 Claims, 6 Drawing Figures

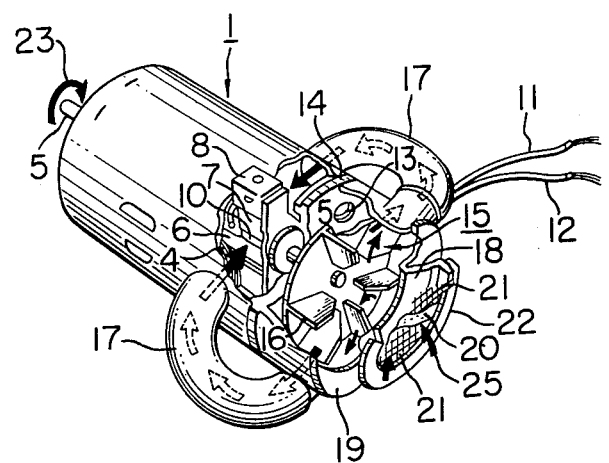
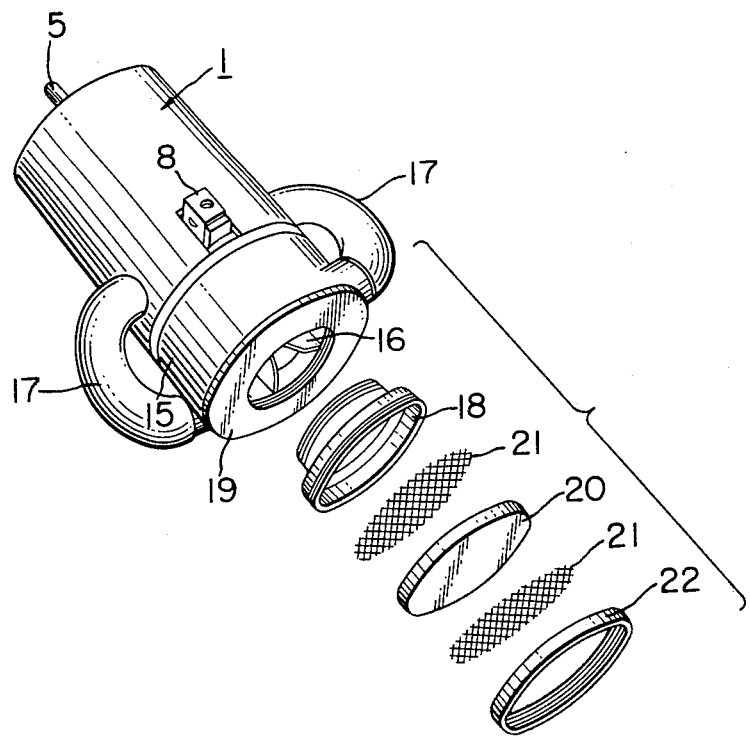

FIG. 3
FIG. 5
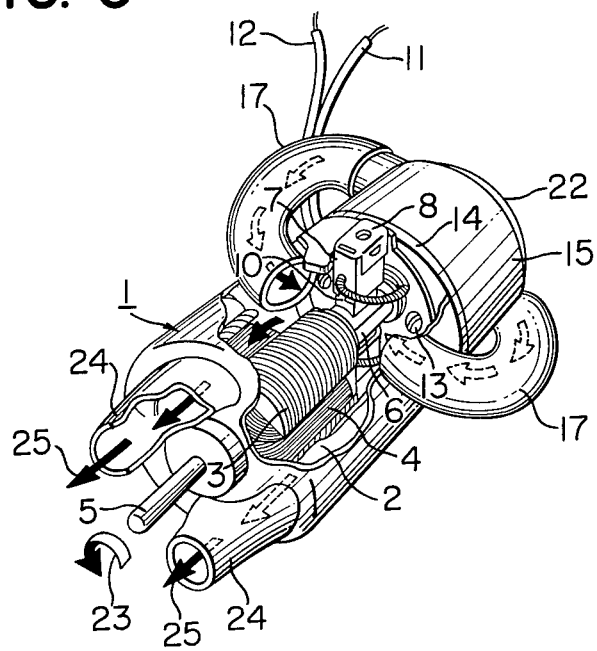
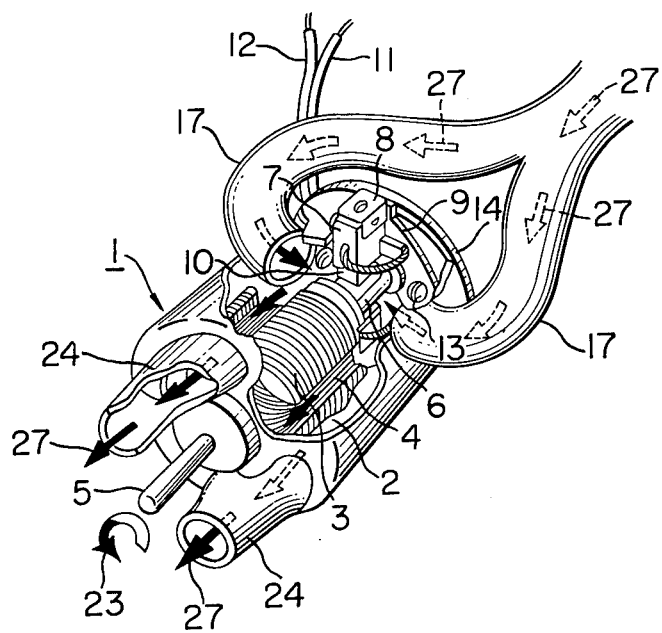

FORCED COOLED ELECTRIC MOTOR

BACKGROUND OF THE INVENTION

1. Field of the Invention

This invention relates to a forced cooled electric motor and more particularly to a forced cooled electric motor which is equipped with ducts for applying jets of a cooling medium therethrough directly onto the surface of contact between the brush and the commutator at the commutator section of the motor whereby the motor, even though it may be small in size and weight, can furnish a very high power.

2. Description of the Prior Art

Recently, electric motors of small size and small weight and yet capable of providing a high power have been needed for battery driven automobiles, motorboats, battery-driven radio-controlled big model airplanes, etc. For example, a magnet motor with a load current of 10A or more is desired. It has been a problem, however, how to cool the motor. A relatively simple means for a forced cooling of a motor has been the provision of a fan on the shaft of the motor. In such prior art means the flow of cooling medium caused by the fan is introduced into the interior of the motor coaxially of the motor shaft and therefore subjected to turbulence because of the existance of the shaft bearings, brush holders, etc. Thus with the prior art means it is difficult to supply a powerful flow of cooling medium onto the commutator region where commutation of big current is taking place.

SUMMARY OF THE INVENTION

It is an object of the invention to provide a forced cooled electric motor having ducts for directing jets of cooling medium directly onto the surface of contact between the commutator and the brush at the commutator region of the motor whereby to prevent the efficiency drop of the motor due to heat generated therein and to forcibly blow out the spark occurring at the commutator to substantially reduce electrical noise.

It is another object of the invention to provide a forced cooled electric motor equipped with ducts through which a cooling medium supplied from an external positive pressure source and/or from an external negative pressure source is led to strike as jets directly the surface of contact between the commutator and the brush at the commutator region of the motor.

It is another object of the invention to provide a forced cooled electric motor with a blower fan on its shaft and equipped with ducts through which the flow of cooling medium from the fan is led to be directed in the form of jets directly onto the surface of contact between the brush and the commutator at the commutator region of the motor.

It is still another object of the invention to provide a forced cooled electric motor equipped with a suction fan on its shaft and ducts through which the flow of cooling medium from the fan is led to be directed as jets directly onto the surface of contact between the brush and commutator at the commutator region of the motor.

It is a further object of the invention to provide means using a filter to clean the cooling medium to be directed onto said commutator.

It is yet a further object of the invention to recover the cooling medium blown on said commutator and circulated through the motor for heating the interior of such as a battery driven automobile.

BRIEF DESCRIPTION OF THE DRAWINGS

FIG. 1 is a perspective view, partially broken away, of a motor embodying the invention using a blower fan as the cooling means;

FIG. 2 is an exploded perspective view showing how the filter means is arranged;

FIG. 3 is a perspective view, partly broken away, of another motor embodying the invention using a blower fan as the cooling means;

FIG. 5 is a perspective view, partly broken away, of a motor embodying the invention which does not have a mechanism for generating a stream of cooling medium as cooling means located within the motor case.

DETAILED DESCRIPTION OF THE EMBODIMENT

Figure 4:
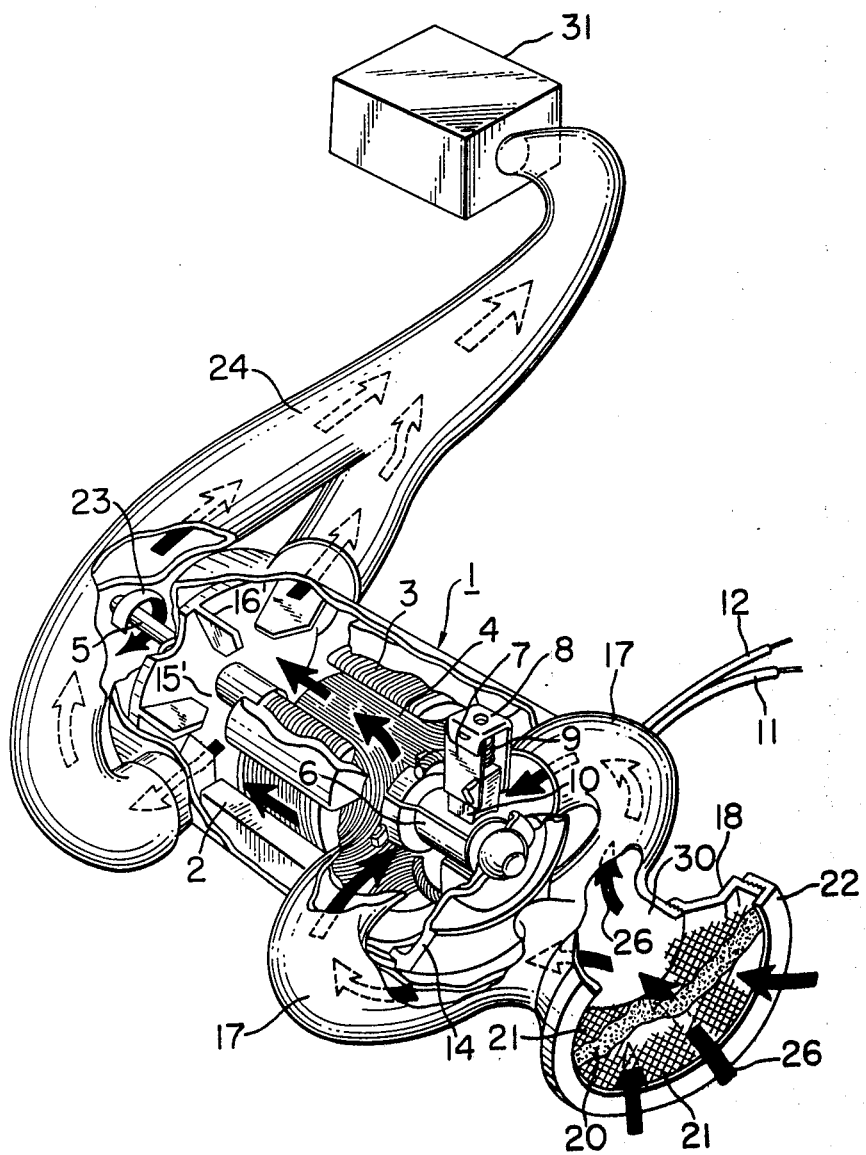
FIG. 4 is a perspective view, partly broken away, of a motor embodying the invention using a suction fan as the cooling means.

FIG. 1 shows an embodiment of the motor in accordance with the invention in which a blower fan is used as the cooling means. Within the motor case 1 are mounted a stator 2 made of permanent magnets, for example, and a rotor 3 with windings thereon. Said rotor 3 has rotor windings wound thereon. The stator and the rotor 3 are clearly shown in the embodiment shown in FIG. 4. The rotor 3 is supported by rotor shaft 5 for revolution. A commutator 6 is mounted on the rotor shaft 5. Located opposite the commutator 6 are brush holders 7 in each of which a brush 10 is held and urged by cap 8 and spring 9. The motor is driven for revolution by connecting leads 11 and 12 to a direct-current power source, not shown. The numeral 14 in the drawing represents a back cap for the motor case.

The motor mentioned above is provided with a blower fan chamber 15 in which there is provided a blower fan 16 arranged to be driven by the motor shaft 5. The blower fan chamber 15 is fixed to the back cap 14 of the motor case by means of screws 13 and separated by said back cap. FIG. 2 is a disassembled perspective illustration showing the arrangement of the filter section of a motor having a blower fan. The blower fan chamber 15 has a cover 19 with a filter nozzle 18. A filter 20 and screens 21, 21 are placed in the filter nozzle 18 and a filter nozzle ring 22 is fitted thereover.

In the case of a motor with a blower fan (as clearly seen in the motor shown in FIG. 3) ducts 17, 17 are removably connected to the periphery of the blower chamber 15 and arranged to extend through holes in the motor case 1 to the commutator section, where the ducts open opposite the surface of contact of the commutator 6 with the brushes 10. When the blower fan 16 is rotated with high speed by the revolution of the motor (as shown by arrow 23), the cooling medium after filtered with the filter 20 as shown by arrow 25 is drawn into the blower chamber 15 and forced by the rotation of the blower fan 16 to pass through the ducts 17, 17 so as to blow onto the surface of contact of the commutator 6 with the brushes 10. After blowing as mentioned above, the cooling medium passes through the gap between the stator 2 and the rotor 3 and then discharges out at the other end of the motor case 1.

FIG. 3 shows an arrangement for recovering the cooling medium in the motor shown in the embodiment of FIG. 1. In the Figure the route for the cooling medium to flow through the motor is indicated by the arrows. The cooling medium flows shown by arrows 25 are collected and reused as will be later described.

FIG. 4 shows an embodiment of the electric motor using a suction fan as cooling means in accordance with the invention. This motor is the same in construction as the foregoing motor with a blower fan, but it is provided with a suction fan chamber 15' in which is arranged a suction fan 16' to be driven by the shaft 5 of the motor. In the preferred embodiment the suction fan chamber 15' is shown provided in the interior of the motor case 1. The open ends of the ducts 17 are positioned at the commutator region located on the side opposite to said suction fan chamber 15'. The other end of the ducts 17 forms a suction opening 30 fitted with a filter nozzle 18 which has a filter 20 and screens 21, 21 therein and a filter nozzle ring 22 fitted thereover, in the same manner as in FIG. 2. As the suction fan 16' runs at a high speed with the revolution of the motor, it causes cooling medium to pass through the motor case 1 and go out through exhaust tube 24 as shown by the arrows in the FIGURE. At the same time, there is a flow of cooling medium coming in through the filter nozzle 18 after being filtered with the filter 20, as shown by the arrows 26. Thus, as the suction fan 16' rotates, the cooling medium is made to pass through ducts 17, 17 to blow onto the surface of contact between the commutator 6 and the brush 10. The cooling medium thus blown passes through the gap between the stator 2 and the rotor 3 of the motor and discharges from the other end of the motor case 1.

FIG. 5 shows an embodiment of the invention in which no mechanism for generating a flow of cooling medium as cooling means is not provided in the interior of the motor case 1. The motor part is of the same construction as those shown in FIGS. 1 to 4. The motor is provided with ducts 17, 17 opening opposite the surface of contact of the commutator 6 with brushes 10. On the opposite side of the motor case 1 is exhaust pipes 24, 24 The arrow 23 represents the revolution of the motor.

In one form of this embodiment the ducts 17, 17 are connected to an external source of pressure (not shown) which supplies cooling medium as shown by arrows 27 and, in another form the ducts 24, 24 are combined into a single tube and connected to an external source of negative pressure which draws cooling medium as shown by arrows 27. With such an external source of pressure of an external source of negative pressure connected, the cooling medium passes through the ducts 17, 17 as shown by arrows 27 and blows directly on the surface of contact of the commutator 6 with the brushes 10. In other words, the cooling medium is directed onto commutator 6 in jets under pressure. The cooling medium thus blown is passed through the gap between the stator 2 and the rotor 3 and discharged from the other end of the motor case 1.

It is understood that in any of the foregoing embodiment using cooling means of the invention, the cooling medium flowing through the ducts 17, 17 is blown directly onto the surface of the surface of contact between the brushes 10 and the commutator 6, that is, the cooling medium is directed in the form of a stream under pressure directly to the commutator 6, so that heat generated in the commutator 6 will be forcedly removed and sparks generated at brushes 10 may be blown out. The cooling medium after blowing, is circulated in the motor case 1 to forcingly cool stator 2 and rotor 3 and its windings 4 and then collected in the exhaust tube 24 for subsequent use such as room heating in a battery driven automobile, that is, it is led to be used in a medium utilization apparatus 31 as shown in FIG. 4.

Figure 6:
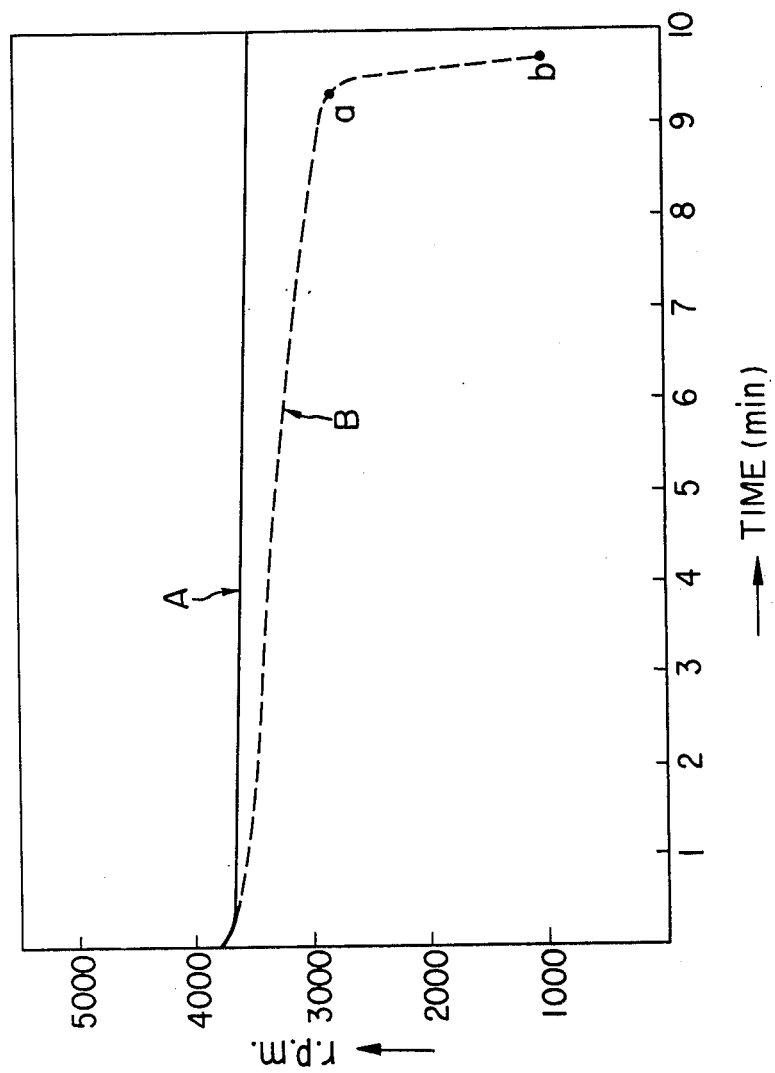
FIG. 6 is a diagram showing the characteristics of a motor with cooling means of the invention compared with that of a motor without cooling means.

FIG. 6 represents the characteristics of a motor with cooling means in accordance with the invention compared with that of a motor without cooling means. In the figure, the abscissa denotes running time and the ordinate denotes revolution velocity. The solid curve A is the characteristics of a motor of the invention while the dotted curve B represents the characteristics of a motor having no cooling means. The characteristics illustrated were obtained when the respective motors were connected to a 16V dc voltage source, the load current being as great as nearly 11A. In the case of the motor of the invention as shown by curve A, the revolution velocity only slightly decreases with time. In the case of curve B, however, the revolution velocity rapidly decreases because of heat generation. At point $a$ after 9 minutes a change of color (oxydation) occurs on the commmutator and the soldering for the windings begins to melt and scatter and the bearing portion of the back cap 14 of the motor case, which is made of plastic material, melts and changes its shape until at last the motor stops at point $b$.

I claim:

1. A forced cooled electric motor having a stator comprising permanent magnets, said stator being secured to the motor case, a rotor having rotor coils, said rotor being rotatable relative to said stator, a commutator means for controlling supply of current to said stator or rotor, said motor case enclosing said stator, said rotor and said commutator means having at least one outlet that is spaced from said commutator means, a fan driven by the revolution of the motor and at least one external, elongated duct having a portion thereof arranged to extend through the motor case, said duct having a first end open to the atmosphere and a second end positioned within said motor case and in direct opposition to the surface of contact between the brushes and the commutator of the commutator means whereby cooling medium led through said duct blows directly onto the commutator means.

2. A forced cooled electric motor as claimed in claim 1, having a blower fan chamber separated at one end of said commutator region and a blower fan disposed in said blower fan chamber and driven by the revolution of the motor, said duct opening at one end into said blower fan chamber and opening at the other end opposite said commutator means.

3. A forced cooled electric motor as claimed in claim 1, having a suction fan chamber separated at one end of said commutator region and a suction fan disposed in said suction fan chamber and driven by the revolution of the motor, said duct opening at one end to the cooling medium suction aperture and opening at the other end opposite said commutator means.

4. A forced cooled electric motor as claimed in claim 1, provided with a cleaner at one end of said duct for cleaning the cooling medium.

5. A forced cooled electric motor as claimed in claim 2, provided with a cleaner at one end of said blower fan chamber for cleaning the cooling medium.

6. A forced cooled electric motor as claimed in claim 4, in which said cleaner comprises a porous filter disposed in a filter nozzle fitted with a filter nozzle cap.

7. A forced cooled electric motor as claimed in claim 1, provided with an exhaust medium utilization means at the outlet for the cooling medium.

8. A forced cooled electric motor as claimed in claim 7, in which said exhaust cooling medium utilization means is for room heating for a battery driven automobile.

9. A forced cooled electric motor as claimed in claim 1, in which said duct is removably arranged.

10. A forced cooled electric motor as claimed in claim 1 wherein there are a plurality of said ducts angularly spaced apart from each other about the periphery of said commutator means.

11. A forced cooled electric motor having a stator comprising permanent magnets, said stator being secured to the motor case, a rotor having rotor coils, said rotor being rotatable relative to said stator, commutator means for controlling a supply of current to said stator or rotor, said motor case enclosing said stator, said rotor and said commutator means and having at least one outlet that is spaced from said commutator means, a fan driven by the revolution of the motor, at least one duct arranged to extend through the motor case and to open opposite the surface of contact between the brushes and the commutator of the commutator means whereby cooling medium led through said duct blows directly onto the commutator means, a blower fan chamber separated at one end of said commutator region, a blower fan disposed in said blower fan chamber and driven by the revolution of the motor, said duct opening at one end into said blower fan chamber and opening at the other end opposite to said commutator means, a cleaner at one end of said duct for cleaning the cooling medium and a cleaner at one end of said blower fan chamber for cooling the cooling medium, said cleaners comprising a porous filter disposed in a filter nozzle fitted with a nozzle cap.

12. A forced cooled electric motor as claimed in claim 11 wherein said duct is external of said motor case.

13. A forced cooled electric motor as claimed in claim 11, wherein there are a plurality of said ducts angularly spaced apart from each other about the periphery of said commutator means.

14. A forced cooled electric motor having a stator comprising permanent magnets, said stator being secured to the motor case, a rotor having rotor coils, said rotor being rotatable relative to said stater, a commutator means for controlling a supply of current to said stator or rotor, said motor case enclosing said stator, said rotor and said commutator means and having at least one outlet that is spaced from said commutator means, a fan driven by the revolution of the motor, at least one duct arranged to extend through the motor case and to open opposite the surface of contact between the brushes and the commutator of the commutator means whereby cooling medium led through said duct blows directly onto the commutator means, a suction fan chamber separated at one end of said commutator region, a suction fan disposed in said suction fan chamber and driven by the revolution of the motor, said duct opening at one end to the cooling medium suction aperture and opening at the other end opposite said commutator means, a cleaner at one end of said duct for cleaning the cooling medium, a cleaner at one end of said suction fan chamber for cleaning the cooling medium, said cleaners comprising a porous filter disposed in a filter nozzle fitted with a filter nozzle cap.

15. A forced cooled electric motor as claimed in claim 14 wherein said duct is external of said motor case.

16. A forced cooled electric motor as claimed in claim 14 wherein there are a plurality of said ducts angularly spaced apart from each other about the periphery of said commutator means.

* * * * *